(12) United States Patent
Wehmeier et al.

(10) Patent No.: US 9,232,421 B2
(45) Date of Patent: Jan. 5, 2016

(54) DIFFERENTIATION BETWEEN MOBILE AND FIXED MOBILE RADIO TERMINALS

(75) Inventors: Lars Wehmeier, Berlin (DE); Volker Breuer, Bötzow (DE)

(73) Assignee: CINTERION WIRELESS MODULES GMBH, Munich (DE)

( * ) Notice: Subject to any disclaimer, the term of this patent is extended or adjusted under 35 U.S.C. 154(b) by 902 days.

(21) Appl. No.: 13/145,986

(22) PCT Filed: Nov. 2, 2010

(86) PCT No.: PCT/EP2010/066622
§ 371 (c)(1),
(2), (4) Date: Jul. 3, 2013

(87) PCT Pub. No.: WO2011/054813
PCT Pub. Date: May 12, 2011

(65) Prior Publication Data
US 2013/0273904 A1    Oct. 17, 2013

Related U.S. Application Data

(60) Provisional application No. 61/258,957, filed on Nov. 6, 2009.

(30) Foreign Application Priority Data

Nov. 6, 2009   (EP) ..................... 09175285

(51) Int. Cl.
*H04W 24/00* (2009.01)
*H04W 24/08* (2009.01)
*H04W 52/02* (2009.01)
*H04W 76/04* (2009.01)

(52) U.S. Cl.
CPC .......... *H04W 24/08* (2013.01); *H04W 52/0216* (2013.01); *H04W 76/048* (2013.01)

(58) Field of Classification Search
None
See application file for complete search history.

(56) References Cited

U.S. PATENT DOCUMENTS

| | | | |
|---|---|---|---|
| 6,269,250 B1 | 7/2001 | Bender et al. | 455/522 |
| 2005/0009548 A1 | 1/2005 | Kelley et al. | 455/509 |
| 2007/0287476 A1 | 12/2007 | Jeong et al. | 455/456.6 |

FOREIGN PATENT DOCUMENTS

| | | |
|---|---|---|
| EP | 1 583 257 | 10/2005 |
| WO | 00/13377 | 3/2000 |
| WO | 02/03719 | 1/2002 |
| WO | 2007/080399 | 7/2007 |

(Continued)

OTHER PUBLICATIONS

Extended European Search Report for corresponding European Application No. 09 17 5285.7, dated Jul. 28, 2010, 13 pages.

(Continued)

*Primary Examiner* — Erika A Washington
(74) *Attorney, Agent, or Firm* — Seed IP Law Group PLLC (57) ABSTRACT

A method of operating a mobile radio communication terminal, in which execution of at least one step of the method is controlled according to a device parameter which is assigned to the mobile radio communication terminal and which has exactly one of two possible device parameter values which indicate whether the mobile radio communication terminal is permanently stationary or not permanently stationary.

19 Claims, 3 Drawing Sheets

(56) References Cited

FOREIGN PATENT DOCUMENTS

| | | |
|---|---|---|
| WO | 2007/088381 | 8/2007 |
| WO | 2009/046767 | 4/2009 |

OTHER PUBLICATIONS

Partial European Search Report for corresponding European Application No. 09 17 5285.7, dated Apr. 23, 2010, 8 pages.

International Search Report and Written Opinion for PCT/EP2010/066622 dated Mar. 14, 2011, 19 pages.

Fig. 4
- Stand der Technik -

DIFFERENTIATION BETWEEN MOBILE AND FIXED MOBILE RADIO TERMINALS

The present invention relates to a mobile radio communication terminal and a method of operating a mobile radio communication terminal. It also relates to a base station and an operating method for a base station and to a mobile radio communications infrastructure and an operating method for a mobile radio communications infrastructure.

Selection of a suitable mobile network cell by a mobile radio communication terminal according to the received signal strength is known from WO 00/13377. When a suitable cell has been found, the mobile radio communication terminal logs into the assigned access network via the respective cell. A base station used for this purpose is then used by the mobile radio communication terminal as the currently serving/selected base station. The mobile radio communication terminal regularly checks, also after logging in, whether there is a mobile network cell providing better reception. When this is the case, the better cell is selected.

Measurements for such cell reselection by the terminal are carried out in all states of the mobile radio communication terminal in which the user equipment can perform a cell change autonomously. In addition to an inactive state referred to as "IDLE", these states may include other states known in UMTS or other mobile communications technologies, such as Cell PCH or URA-PCH. This inactive state is periodically interrupted in order to check whether signals directed at the mobile radio communication terminal are received from the external base station. Such signals are typically paging signals that are transmitted on a special signaling channel. The paging signals are transmitted at specific times. The interval between successive transmissions of paging signals defines a "discontinuous reception period", or "DRX period" for short. WO 00/13377 describes that the DRX cycle duration may differ in length, and proposes that the number of measurements for cell selection be chosen according to the respective DRX cycle duration.

Within a cell, however, the cycle duration of the DRX cycle is identical for all mobile radio communication terminals that are in a state allowing autonomous cell selection. This applies for both second-generation radio communication standards (GSM) and for third-generation radio communication standards (UMTS). The DRX cycle duration is typically made dependent on the characteristic features of a specific mobile network cell, for example of an environment in which that cell is located. For example, a shorter DRX cycle duration is chosen in an urban environment so that mobile radio communication terminals that would have to switch to a different cell within a short time, for example when moving into a subway station, are able to make that change without noticeable delays. A longer DRX cycle is prescribed, in contrast, by mobile network cells in environments that allow longer parallel reception of the serving cell and a neighboring cell, and which can therefore provide a longer time for changing cells without delays. More specifically, these may be mobile network cells of greater geographical expanse, in which a mobile radio communication terminal typically spends a longer time.

One disadvantage is that a DRX cycle duration which may be unreasonably short or unreasonably long is assigned in this way to mobile radio communication terminals independently of the behavior of their users and independently of the purpose for which it is being used. For example, a vending machine that is connected via a radio modem to a service headquarters and which is installed in an urban environment must operate with a very short DRX cycle duration. This necessitates frequent activation of the radio modem from an inactive state, and also requires measurement of neighboring cells at respective intervals that are unreasonably short for the radio modem in this application.

The shorter the DRX cycle duration, the higher is the average power consumption of a mobile radio communication terminal, since the durations of the activity and inactivity periods of a mobile radio communication terminal are defined on the basis of the DRX cycle duration.

WO 2007/080399 A1 describes mobile radio communication terminals that are installed in a vending machine or in a vehicle or in an alarm system. In the core network, a "terminal type identifier" TTID is set for such stationary terminals to "FIXED" and communicated to the access network. According to the message sequence shown in FIGS. 2A/2B, this TTID parameter is sent in an "insert subscriber data" message 122 in response to a location update message by HRR/HSS to the assigned serving GPRS support node SGSN. The SGSN then instructs the mobile radio communication terminal with a GMM attach accept message 128 not to perform any more periodic location updates.

The object of the present invention is therefore to specify a mobile radio communication terminal, a method of operating a mobile radio communication terminal, a base station and an operating method for a base station, a mobile radio communications infrastructure and an operating method for a mobile radio communications infrastructure which permit control behavior that is adapted to the actual use of the mobile radio communication terminal.

According to a first aspect of the present invention, a method of operating a mobile radio communication terminal is specified in which execution of at least one step of the method is controlled according to a device parameter which is assigned to the mobile radio communication terminal and which has exactly one of two possible device parameter values which indicate whether the mobile radio communication terminal is permanently stationary or not permanently stationary.

The operating method according to the invention allows operation of a mobile radio communication terminal to be controlled according to whether or not the mobile radio communication terminal is a permanently stationary device, a fact that is important for many application contexts.

The operating method of the first aspect of the invention is based on the realization that mobile radio communication is also used to an increasing extent by permanently stationary terminals for which mobile communication networks, as the name suggests, were not designed. However, due to existing signaling protocols, these permanently stationary mobile radio communication terminals must execute the same procedures as those executed by moving mobile radio communication terminals in order to maintain contact with the mobile communications network while moving. For example, prior art methods for supporting mobility in semi-idle states and based on cell reselection controlled by the mobile radio communication terminal require regular measurements being carried out, the frequency of which depends on cell parameters such as the DRX cycle, regardless of whether the mobile radio communication terminal is permanently stationary or not. However, such procedures are often unnecessary for permanently stationary mobile radio communication terminals, or could be carried out in other ways that require less energy. The known prior art does not offer any method for taking such differences between permanently stationary and non-permanently stationary mobile radio communication terminals into consideration.

In embodiments of the operating method according to the invention, it is possible not only to save energy for operating the mobile radio communication terminal, but also to reduce the load on the mobile radio communications infrastructure.

It should be noted that the expressions used for network nodes in the present description and in the claims are not to be understood as limiting the applicability of the invention to a specific radio communication standard. The expression "base station", for example, is used in a way that covers embodiments according to a 2G standard for mobile communications, such as GSM, as well as a 3G standard for mobile communications, such as UMTS, or according to any other or future standard. Nor is the applicability of the invention limited to mobile radio communication terminals in wide area mobile radio communication networks, such as those supported by GSM and UMTS. It may also be applied equally well in local mobile communication networks such as pico-cells, WLAN, WiFi and the like.

Embodiments of the inventive operating method shall now be described. The additional features of the embodiments described here may be combined with each other to form further embodiments, unless the respective embodiments are explicitly described as alternative to each other.

In the operating method according to the invention, the device parameter assigned or to be assigned to the mobile radio communication terminal is preferably detected or determined as "permanently stationary" or "not permanently stationary" in an autonomous manner, that is to say, solely by the mobile radio communication terminal itself.

Autonomous definition of the device parameter is a particularly beneficial characteristic, since it can be incorporated into existing networks and structures without modifications having to be made, since all the decisions in this regard are made internally by the mobile radio communication terminal. In other words, there is no signaling by an external device, such as a base station of a wireless network, to the mobile radio communication terminal, in order to assign the mobile radio communication terminal its device parameter value. The device parameter value may be determined autonomously by the mobile radio communication terminal, for example by fetching the device parameter value as one value (of two possible values) stored in an internal memory of the terminal, or by reading a hardware setting (similar to a jumper). It is also possible for a logical linkage between "permanently stationary" and the execution of a specific action to be stored. That action may be one which takes place in the mobile radio communication terminal itself. That does not necessarily have to be the case, however. If the mobile radio communication terminal is realized, for example, by a mobile communications module which performs functions interactively with an externally executed application program (or "application" for short) which communicates with the module, said action may be performed or initiated by the mobile communications module itself, or externally and accordingly by the application external to the module.

In other embodiments, the operating method includes performing one or more measurements of a variable whose values indicate individually or collectively whether the mobile radio communication terminal is permanently stationary or not permanently stationary, and determination the device parameter value by the mobile radio communication terminal according to the detected value or detected values of the variable. The latter involves the mobile radio communication terminal detecting the value of the device parameter, during operation of the mobile radio communication terminal, by analyzing measurements that the mobile radio communication terminal performs autonomously and then stores internally. Depending on the type of mobile radio communication terminal, this may involve a direct geographical determination by means of a positioning method (GPS), or measuring radio signals from different stations and determining the resultant position or time-dependent change in the measured signals as such.

Although, in different embodiments described below, the mobile radio communication terminal communicates to the network the device parameter that it itself has previously and autonomously detected, this is not to be understood as original detection or determination of the device parameter by the network.

The distinction between "permanently" and "not permanently" relates in different variants of the invention to differing time periods.

In one embodiment, "permanently stationary" shall be understood to mean that the respective mobile radio communication terminal is stationary at least for the duration of the login to the current mobile network cell. A desired change in the parameter value is associated in this embodiment with a logout and new login to the mobile network cell, or with a new login to a different mobile network cell. It can thus be assumed in any case that, when signaling is carried out between the mobile radio communication terminal and the respective base station for the duration of reciprocal assignment to each other, the mobile radio communication terminal is to be treated after logging in as permanently stationary or not permanently stationary and that it applies the respective operating method itself. Dynamic alteration of the device parameter value by the mobile radio communication terminal while assigned to a specific mobile network cell is not envisaged in this embodiment.

One variant, in contrast, provides for dynamic variability of the device parameter value by the mobile radio communication terminal. In this variant, classification as permanently stationary/not permanently stationary may also vary even during assignment to a specific base station, without a new login or a similarly complicated signaling process being required. For example, a mobile radio communication terminal located in a vehicle, e.g. in the form of an installed module, may be allowed to operate as permanently stationary only when the vehicle is switched off.

Classification as permanently stationary when the engine is switched off may be associated with hysteresis, such that only after a certain time has elapsed is the state defined as permanently stationary until the engine is switched on again. The defined state can then be communicated by means of signaling to components in the network.

In another variant, the device parameter is a value that is fixedly assigned during operation and which cannot be changed during execution of a method of operating the mobile radio communication terminal. If a change in the device parameter value is nevertheless to be allowed, the device parameter value may be changed in this variant, for example by manual adjustment of the mobile radio communication terminal.

The following description of further embodiments is organized into three groups of embodiments relating to different application contexts for the inventive method of operating a mobile radio communication terminal. The operating method may cover the different application contexts in combination, which means that it is possible to combine embodiments from the different application contexts of the inventive operating method as described below. However, it is also possible to use the operating method in just one or two application contexts.

In embodiments relating to a first application context, the operating method includes periodically interrupting an inactive state of the mobile radio communication terminal in order to perform a respective check as to whether signals directed at the mobile radio communication terminal are being received from an external base station, this periodic checking being carried out with a cycle duration which is individually assigned to the mobile radio communication terminal and which depends on the device parameter value which indicates whether the mobile radio communication terminal is permanently stationary or not permanently stationary.

With this method of operating a mobile radio communication terminal, the cycle duration for checking reception of signals in the inactive state can be successfully tailored to the actual use of the mobile radio communication terminal. In the case of mobile radio communication terminals that can make use of a long cycle duration, the power consumption in the inactive state can thus be significantly reduced. This is advantageous not only in battery-powered mobile radio communication terminals, in which the operating time between battery recharges can be increased by utilizing the operating method according to the invention. Reduced power consumption also reduces the costs of a fixedly installed mobile communications module, by lowering its operating costs.

The cycle duration assigned to the mobile radio communication terminal preferably has a first (higher) cycle duration value when the device parameter value assigned to the mobile radio communication terminal indicates that the mobile radio communication terminal is permanently stationary. In contrast thereto, it is advantageous to assign a relatively smaller second cycle duration value to mobile radio communication terminals that are not permanently stationary. The shorter cycle duration value is typically the default setting provided for a respective mobile network cell. However, it is not imperative to limit the possible cycle duration values for checking reception of signals from the base station to exactly two values. More than two values may also be provided for selection, the selection being made, for example, by the assigned base station and signaled to the mobile radio communication terminal.

It is advantageous, for example, to assign individual mobile radio communication terminals to groups having different cycle durations. The different cycle durations in this case are preferably multiples of a basic cycle duration. In one advantageously simplified variant, an extended cycle duration for permanently stationary terminals lasts twice as long as the basic cycle duration, thus minimizing any signaling that may be necessary.

In one variant, several groups are provided with the same assigned cycle duration. However, these groups have cycles with the same cycle duration but different relative starting times. In one example, the interval between the starting times is the same length as a basic cycle duration.

In another embodiment, the cycle duration is additionally dependent on at least one current value of a state parameter which indicates the current state of the mobile radio communication terminal.

This may be a current battery status of the mobile radio communication terminal, for example. Depending on the device parameter value, it is possible to change the assigned cycle duration to higher or lower values, with the state parameter being taken into consideration thereby. In this way, the cycle duration may adopt more than two cycle duration values according to the combination of device parameter value and the current state parameter value.

In another example of such an embodiment, the cycle duration is varied dynamically within a defined frame. In this variant, the cycle duration may thus vary even during assignment to a specific base station, without a new login or a similarly complicated signaling process being required. For example, a mobile radio communication terminal located in a vehicle, e.g. in the form of an installed module, may be allowed to operate with a different cycle duration when the vehicle is switched off to when the vehicle is switched on.

In such embodiments that use the state parameter, the device parameter and the at least one state parameter may be subjected to prioritization of such a kind that the parameter whose detected current value is assigned a longer cycle duration is weighted more heavily relative to other parameters when the cycle duration is being assigned.

Different embodiments for detecting the device-specific cycle duration are conceivable. In one embodiment of the operating method according to the invention, the mobile radio communication terminal transmits the device parameter value and any other current state parameter values when or after it logs into the external base station. In a first variant, the cycle duration may be assigned by the external base station to the mobile radio communication terminal. Alternatively, in a second variant, the mobile radio communication terminal may detect the cycle duration value internally. Depending on the network setup, the internally detected cycle duration may then be communicated to the base station, or the base station detects the cycle duration itself on the basis of the parameter values transmitted to it.

In embodiments relating to a second application context, the operating method includes regularly repeated transmission of a respective current channel quality indicator from the mobile radio communication terminal to an external base station, wherein the channel quality indicator is a criterion for a signal-to-noise ratio or for a signal-to-noise-plus-interference ratio of a channel on which the mobile radio communication terminal receives radio signals directed at the mobile radio communication terminal from the external base station. The transmissions are performed with a time interval which is individually assigned to the mobile radio communication terminal and which depends on the device parameter value which indicates whether the mobile radio communication terminal is permanently stationary or not permanently stationary.

The second application context relates to an improvement to known methods for downlink data transmission, i.e., in the direction from a base station to a mobile radio communication terminal. In this case, the mobile radio communication terminal transmits a channel quality indicator to the base station at defined time intervals. The base station decides on the basis of this information and the number of mobile radio communication terminals currently connected to the base station which mobile radio communication terminal is assigned which channel for downlink data transmission.

Data transmission is performed at predefined intervals referred to as TTI (transmission time interval). However, the data throughput does not increase proportionally to the number of channels being used, because interference among the channels increases the more channels are added. The channel quality may therefore deteriorate.

By means of the channel quality indicator, the base station referred to as "node B" in the UMTS standard is able to control HSDPA data transmission to a large number of mobile radio communication terminals. The TTI time intervals for a specific mobile radio communication terminal is predefined on the basis of channel quality indicator values transmitted by that mobile radio communication terminal.

In the prior art, permanently stationary mobile radio communication terminals such as mobile communications modules in stationary vending machines also adhere to this procedure. However, the transmitted values of the channel quality indicator for stationary devices do not change at such a speed that necessitates short time intervals between the transmissions of the channel quality indicator. Short time intervals between such transmissions cause the mobile radio communication terminal to need an unnecessarily high amount of energy, because the mobile radio communication terminal must be switched in each case from an idle state into the operating state in order to be able to transmit the channel quality indicator. An unnecessary increase in interference also occurs, since the amount of new information in the quickly successive channel quality indicators is minimal due to little change in the average channel quality.

What is achieved by the embodiments of the present second application context, in contrast, is that the time intervals between successive transmissions of a channel quality indicator can be adjusted according to whether the mobile radio communication terminal is permanently stationary or not permanently stationary. This reduces the amount of uplink signaling and hence the uplink interference and the individual power consumption of the mobile radio communication terminal.

On the network side, this also allows a high value for the time interval between successive transmissions of the channel quality indicator. The maximum possible value may be permanently specified, for example.

Alternatively, the mobile radio communication terminal may internally detect and use a time interval between successive transmissions. This avoids the control signaling that is otherwise needed between the mobile radio communication terminal and the base station and helps in this way to reduce the energy required by the operating method still further.

In one particularly advantageous variant, the time interval between successive transmissions of the channel quality indicator are predefined by the base station. It may be fixed or variable in alternative embodiments. If it is variable, then the time interval can preferably vary according to another parameter, for example a device feature of the mobile radio communication terminal, such as a configuration parameter. In a further alternative, the mobile radio communication terminal only transmits the channel quality indicator to the base station if the channel quality changes more than a predefined amount. This ensures that the channel quality indicator is transmitted only when it leaves this predefined tolerance range about a predefined value of the channel quality indicator, thus necessitating only a small number of transmissions of the indicator.

In embodiments relating to a third application context, the operating method according to the invention comprises the following steps:
  detecting the device parameter value indicating whether the mobile radio communication terminal is permanently stationary or not permanently stationary;
  changing from an active state to an inactive state;
  periodically executing a cell selection or cell reselection process of the mobile radio communication device, wherein one of a plurality of receivable base stations is selected for communication with the mobile radio communication device after the mobile radio communication device has transitioned to an active state, but only if the device parameter value indicates that the mobile radio communication device is not permanently stationary, and if the mobile radio communication device is in the inactive state;
  not executing the cell selection or cell reselection process while the mobile radio communication terminal is in the inactive state, but only if the device parameter value indicates that the mobile radio communication terminal is permanently stationary, and if the mobile radio communication terminal is in the inactive state.

The embodiments of the present application context relate to methods in which mobile radio communication terminals periodically interrupt an inactive state (such as the known idle state) in order to execute a cell selection or cell reselection process. These embodiments of the operating method according to the invention permit differentiation between permanently stationary and not permanently stationary mobile radio communication terminals. Only the latter perform the cell selection or cell reselection process periodically. Permanently stationary mobile radio communication terminals desist from executing this process and do not interrupt the inactive state for that purpose. This permits a reduction in the energy required to carry out the operating method, which leads to very energy-saving operation, particularly in combination with the operating method according to the previously described application contexts.

In one embodiment, the cell selection or cell reselection process is suppressed as long as the current cell in which the mobile radio communication terminal is in the inactive state provides sufficiently good transmission quality to ensure that communication between the base station and the mobile radio communication terminal can be initiated.

In one embodiment that generates advantages in all three of the application contexts described above, the mobile radio communication terminal transmits the device parameter value to the external base station when or after it logs into the external base station. Depending on the specific embodiment, other current state parameter values may be transmitted, if necessary. This enables the base station to detect and assign to the mobile radio communication terminal the device parameter value and, where relevant, the specifications for operating parameters corresponding to the additional state parameter value.

According to a second aspect of the invention, a mobile radio communication terminal is provided with a terminal control unit. The terminal control unit is configured to control execution of at least one operating step during operation of the mobile radio communication terminal according to a device parameter which is assigned to the mobile radio communication terminal and which has exactly one of two possible device parameter values which indicate whether the mobile radio communication terminal is permanently stationary or not permanently stationary.

The mobile radio communication terminal according to the second aspect of the invention shares the advantages of the method of operating a mobile radio communication terminal, as described above. The mobile radio communication terminal may be embodied as an end-user device, such as a mobile telephone, a mobile communications card for use in a commercially available computer or laptop, or the like. Alternatively, the mobile radio communication terminal is a module for installation in machines, such as vending machines, measuring stations, or the like.

Some embodiments of the mobile radio communication terminal according to the second aspect of the invention shall now be described. The additional features of the mobile radio communication terminal may also be combined with each other to form other embodiments, provided such combinations are not explicitly excluded.

A mobile radio communication terminal is understood in the widest sense to be any user terminal which is suitable for wireless data transmission. In different embodiments, this may be a mobile communications module that, as part of a permanently stationary or not permanently stationary device, controls mobile communications-based data or speech communication with external network devices, such as a base station or another mobile radio communication terminal.

Both the mobile communications module and the aforementioned device form mobile radio communication terminals within the meaning of the present invention. Examples for non-stationary devices containing a mobile communications module are mobile telephones, mobile telephones integrated in machines or vehicles, portable computers such as PDAs or laptops, or mobile sales devices such as devices for train personnel for retrieving, cashless payment and printing of train tickets.

In embodiments, the mobile radio communication terminal is configured to execute an operating method according to one or more embodiments of the first aspect of the invention. The additional features of embodiments for different application contexts may be implemented singly or in combination with one another.

The terminal control unit is preferably configured to detect or determine in an autonomous manner the device parameter assigned or to be assigned to the mobile radio communication terminal as "permanently stationary" or "not permanently stationary", that is to say, without communication on the part of the mobile radio communication terminal with devices external thereto, such as a base station of a wireless network.

In one embodiment of the first application context, the mobile radio communication terminal is equipped with a receiver unit, and the terminal control unit is configured to switch the receiver unit periodically with a predetermined cycle duration from an inactive operating state of the mobile radio communication terminal to an active operating state, i.e. to activate it;

the receiver unit is configured to check, when in the active operating state, whether signals directed at the mobile radio communication terminal are being received, and the terminal control unit is configured, when in the inactive operating state, to activate the receiver unit with a cycle duration which is individually assigned to the mobile radio communication terminal and which depends on the device parameter value which indicates whether the mobile radio communication terminal is permanently stationary or not permanently stationary.

In this terminal, the terminal control unit is configured, when in the inactive operating state, to activate the receiver unit with a cycle duration which is dependent on the device parameter value, of the mobile radio communication terminal, which indicates whether the mobile radio communication terminal is permanently stationary or not permanently stationary. The advantages of this mobile radio communication terminal correspond to those of the operating method in the first application context, as described above.

In a further embodiment, the control unit is configured to activate the receiver unit in the inactive state with a first cycle duration value when the parameter value assigned to the mobile radio communication terminal device indicates that the mobile radio communication terminal is permanently stationary, and otherwise to activate with a cycle duration value that is smaller in comparison with the first cycle duration value.

In another embodiment, the control unit is configured to activate the receiver unit with a cycle duration value that is additionally dependent on at least one current value of a state parameter of the mobile radio communication terminal which indicates a current state of the mobile radio communication terminal.

Yet another embodiment of the mobile radio communication terminal additionally includes a transmitter unit which is connected to the control unit. The control unit is additionally configured to make the transmitter unit transmit the device parameter value and, where relevant, the other current state parameters to the external base station when or after the mobile communications device logs into an external base station.

In alternative embodiments, the control unit is configured to detect the cycle duration assigned to the mobile radio communication terminal from control signals received from the external base station, or to detect the cycle duration assigned to the mobile radio communication terminal internally.

A mobile radio communication terminal for the second application context has a receiver unit and a transmitter unit. The terminal control unit is configured here to regularly and repeatedly transmit a respective current channel quality indicator detected using the receiver unit to an external base station, wherein the channel quality indicator is a criterion for a signal-to-noise ratio or for a signal-to-noise-plus-interference ratio of a channel on which the mobile radio communication terminal receives radio signals directed at the mobile radio communication terminal from the external base station, and to perform the transmissions with a time interval which is individually assigned to the mobile radio communication terminal and which depends on the device parameter value which indicates whether the mobile radio communication terminal is permanently stationary or not permanently stationary.

In one embodiment of the third application context described above, the terminal control unit is configured to detect the device parameter value indicating whether the mobile radio communication terminal is permanently stationary or not permanently stationary;

to switch the mobile radio communication terminal from an active state to an inactive state;

to periodically execute a cell selection or cell reselection process of the mobile radio communication device, but only if the device parameter value indicates that the mobile radio communication device is not permanently stationary, and if the mobile radio communication device is in the inactive state, wherein one of a plurality of receivable base stations is selected for communication with the mobile radio communication device after the mobile radio communication device has transitioned to an active state;

to not execute the cell selection or cell reselection process while the mobile radio communication terminal is in the inactive state, but only if the device parameter value indicates that the mobile radio communication terminal is permanently stationary, and if the mobile radio communication terminal is in the inactive state.

According to a third aspect of the present invention, an operating method for a base station is specified. The operating method comprises the steps of receiving from a mobile radio communication terminal a device parameter value which is assigned to the mobile radio communication terminal having a communication link to the base station, and which forms the exactly one of two possible device parameter values which indicate whether the mobile radio communication terminal is permanently stationary or not permanently stationary, and assigning to the mobile radio communication terminal at least one parameter value for performing at least one step of the method for operating the mobile radio communication terminal according to the received device parameter value.

The advantages of the operating method for a base station correspond to the advantages of the method of operating a mobile radio communication terminal.

The instructions needed to execute and/or parameterize the advantageous operating method or its application to operate the base station or the terminal can be initiated or realized by the mobile radio communications infrastructure and/or its operating method. One advantageous variant could consist in distinguishing, in the mobile radio communications infrastructure and/or its operating method, whether the mobile radio communication terminal is permanently stationary or not permanently stationary.

In one embodiment in the first application context of the invention, the operating method for the base station comprises the following steps:

assigning a cycle duration to the mobile radio communication terminal for periodic checking by the mobile radio communication terminal, during interruptions for that purpose in an inactive state of the mobile radio communication terminal, whether signals directed at the mobile radio communication terminal are being received, wherein the cycle duration is assigned according to the device parameter value which is assigned to the mobile radio communication terminal and which indicates whether the mobile radio communication terminal is permanently stationary or not permanently stationary.

In the second application context, an embodiment of the operating method for a base station comprises the steps of:

regularly repeated reception of a respective current channel quality indicator transmitted from the mobile radio communication terminal, wherein the channel quality indicator is a criterion for a signal-to-noise ratio or for a signal-to-noise-plus-interference ratio of a channel on which the mobile radio communication terminal receives radio signals directed at the mobile radio communication terminal from the base station, and individual assignment of a time interval between transmissions to the mobile radio communication terminal, said time interval being dependent on the device parameter value which indicates whether the mobile radio communication terminal is permanently stationary or not permanently stationary.

According to a fourth aspect of the invention, a base station is specified. A base station according to the invention is configured to execute the operating method of the third aspect of the invention or of one of its embodiments.

The advantages of the base station according to the invention correspond to those of the other aspects of the invention described in the foregoing.

In various embodiments, the base station comprises a receiver unit which is configured to receive from a mobile radio communication terminal a device parameter value which is assigned to the mobile radio communication terminal having a communication link to the base station, and which forms the exactly one of two possible device parameter values which indicate whether the mobile radio communication terminal is permanently stationary or not permanently stationary;

a transmitter unit;

a base station control unit which is connected to the transmitter unit and is configured to transmit at least one parameter value to the mobile radio communication terminal having a communication link to the base station, wherein the parameter value influences the execution of at least one step of a method for operating the mobile radio communication terminal, and wherein the parameter value is dependent on the device parameter value which is assigned to the mobile radio communication terminal and which indicates whether the mobile radio communication terminal is permanently stationary or not permanently stationary.

In one embodiment, the base station can receive the device parameter value from the mobile radio communication terminal, determine the associated cycle duration value on the basis of the received value and assign that cycle duration value to the mobile radio communication terminal.

In other embodiment, the determination and assignment of the cycle duration is additionally dependent on at least one current value of a state parameter which indicates the current state of the mobile radio communication terminal.

In a further embodiment, mobile radio communication terminals having the device parameter "fixed" are paged by paging signals that are repeatedly transmitted within a specific time period. This can prevent such a mobile radio communication terminal missing a paging signal that is transmitted during an inactivity period of the mobile radio communication terminal that is extended with respect to the standard applying hitherto.

Additional embodiments of the base station derive from the additional features of the embodiments of the other aspects of the invention.

Finally, the invention relates to a computer program containing executable program code which is adapted, once installed in a program memory of a programmable processor of a mobile radio communication terminal, to make said mobile radio communication terminal execute a program which carries out an operating method according to the first aspect of the invention or to one of the embodiments described herein.

Another computer program product according to the invention contains executable program code which is adapted, once installed in a program memory of a programmable processor of a base station of a cellular wireless communications network, to make the base station execute a program which carries out an operating method according to the third aspect of the invention or to one of the embodiments described herein.

Another aspect of the invention relates to an operating method for a core network node of a mobile communications network. The core network node controls the operation of a base station. The method comprises:

receiving a device parameter value which is assigned to a mobile radio communication terminal assigned to the core network node, and which forms the exactly one of two possible device parameter values which indicate whether the mobile radio communication terminal is permanently stationary or not permanently stationary, assigning at least one parameter value to a base station having a communication link to the mobile radio communication terminal, for transmission of at least one operating parameter to the mobile radio communication terminal having a communication link to the base station, for executing at least one step of the method for operating the mobile radio communication terminal according to the device parameter which is assigned to the mobile radio communication terminal and which indicates whether the mobile radio communication terminal is permanently stationary or not permanently stationary.

In one embodiment, the operating method comprises:

transmitting a cycle duration to a base station for assignment of the cycle duration to a mobile radio communication terminal connected to the base station, for periodic checking by the mobile radio communication terminal, during interruptions for that purpose in an inactive state of the mobile radio communication terminal, whether signals directed at the mobile radio communication terminal are being received,
wherein the cycle duration is detected by the core network node according to the device parameter value which is assigned to the mobile radio communication terminal and which indicates to the base station whether the mobile radio communication terminal is permanently stationary or not permanently stationary.

In the following, further embodiments of the invention are explained with reference to the attached drawings, in which.

Figure 1:
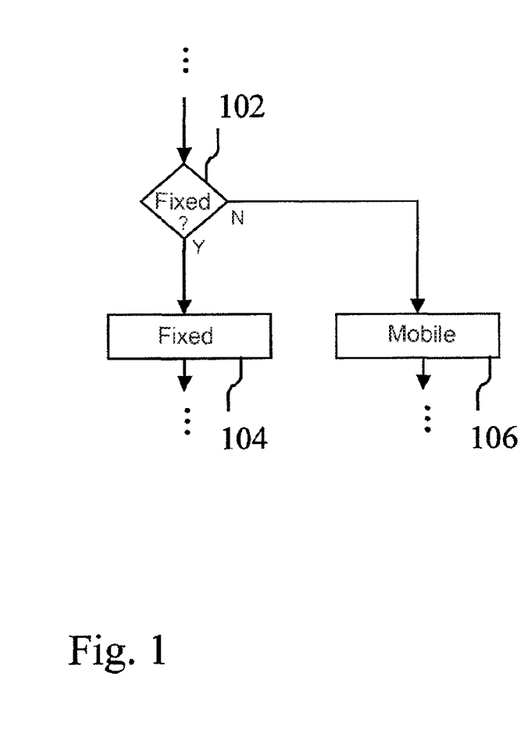
FIG. 1 shows a simplified flow diagram of a first embodiment of a method according to the invention.

FIG. 1 shows a simplified flow diagram of a first embodiment of a method according to the invention for operating a mobile radio communication terminal. The flow diagram in FIG. 1 is greatly simplified and shows common elements of different embodiments of a method of operating a mobile radio communication terminal. Execution of the method before and after these elements is not shown in any further detail, therefore, and is represented by vertically arranged dots. In the embodiment in FIG. 1, it is detected in a step 102 whether the mobile radio communication terminal is permanently stationary or not. To that end, a respective device parameter the value of which is individually assigned to the respective mobile radio communication terminal is checked by the mobile radio communication terminal. The range of values of the device parameter describes exactly two device classes that have not been defined in any further detail in the prior art, namely "permanently stationary" and "not permanently stationary". This is a device class for mobile communication terminals. The meaning of the parameter values may also be described in that sense by the shorter expressions "fixed" and "mobile". The "device class" parameter may be stored in the form of a device class bit, wherein an agreement must be reached on which of the two possible bit values shall denote "fixed" and which shall denote "mobile".

The subdivision into further classes, such as temporarily permanently stationary, may be seen as a further variant of the individual embodiments, whereby manageability, practicability and profitability must be considered separately for each variant. This variant is suitable, more specifically, for applications that noticeably change their operating state, which is to be considered after a certain period as momentarily stationary.

Alternatively, information regarding membership of either of the fixed/mobile device classes may also be stored in a device parameter which is already known and assigned to a mobile radio communication terminal, by extending the value range of that parameter. For the sake of simplicity, however, it is still assumed for the purpose of further description that an internal device parameter is used.

After detecting the value of the device parameter in step 102, the method branches either to step 104 or to step 106, depending on which of the two values the respective mobile radio communication terminal has been assigned.

The method in FIG. 1 for operating a mobile radio communication terminal can thus be summarized as follows:

| Step | Brief description |
| --- | --- |
| 102 | Device class fixed/mobile? |
| 104 | Execution of the method for "mobile" |
| 106 | Execution of the method for "fixed" |

In the following, parallel reference is made to FIGS. 2 to 5.

Figure 2:
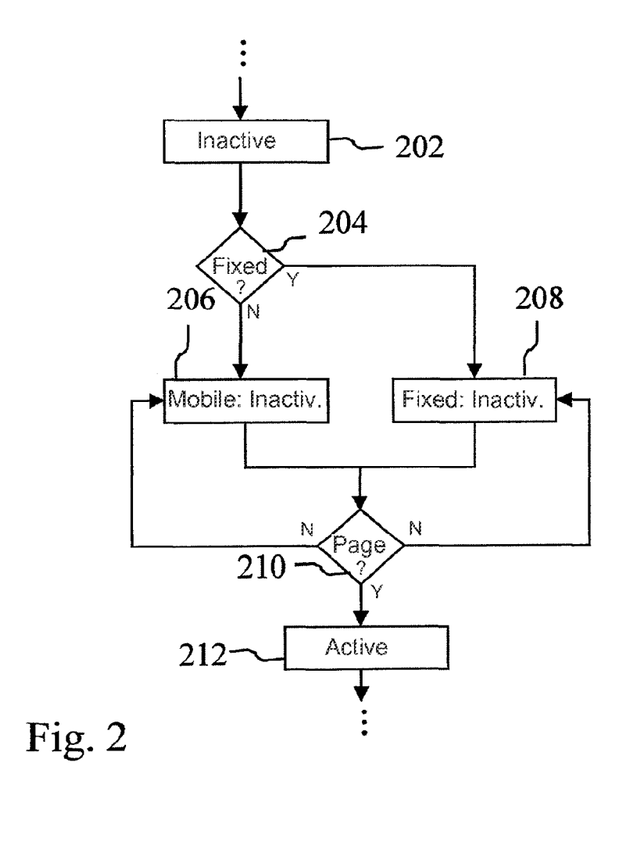
FIG. 2 shows a simplified flow diagram of an embodiment of a method of operating a mobile radio communication terminal, wherein checks are performed in periodically repeated interruptions of an inactive state to determine whether there are any signals from an external base station.
Figure 3:
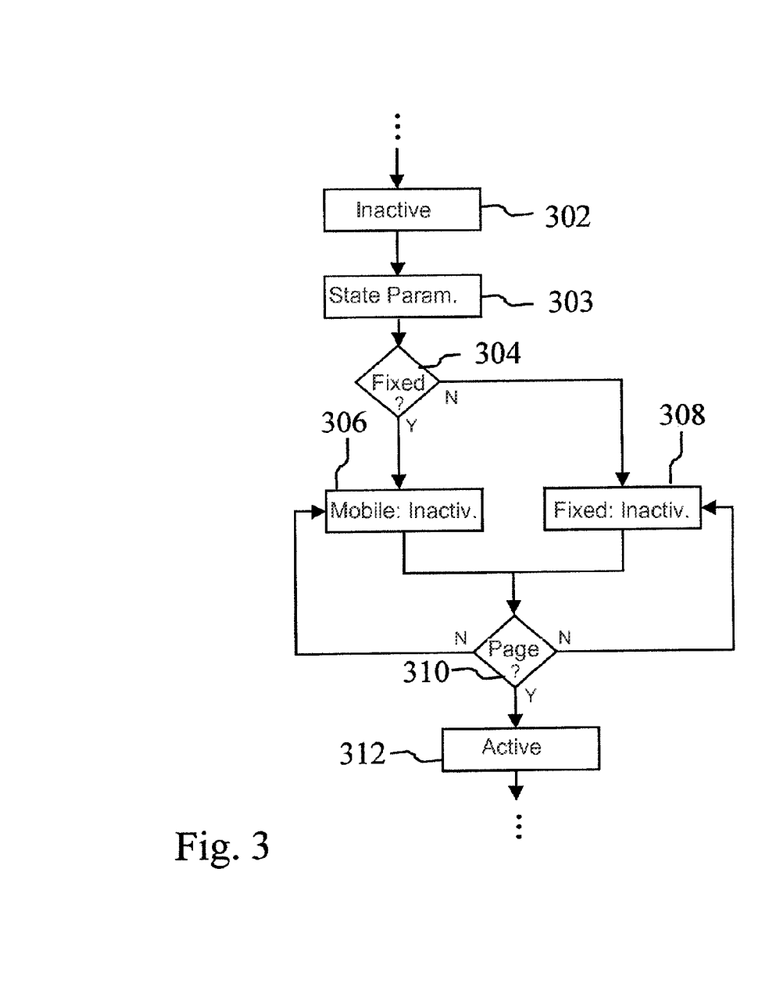
FIG. 3 shows a variant of the method in FIG. 2, wherein the cycle duration of the checks is made additionally dependent on a state parameter value.
Figure 4:
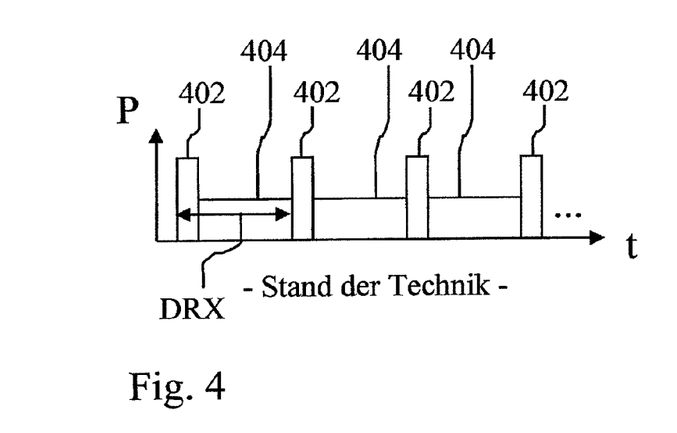
FIGS. 4 and 5 show a schematic view of the power consumption of a mobile radio communication terminal as a function of time in a predominantly inactive state, over the cycle duration of several or one DRX cycle.
Figure 5:
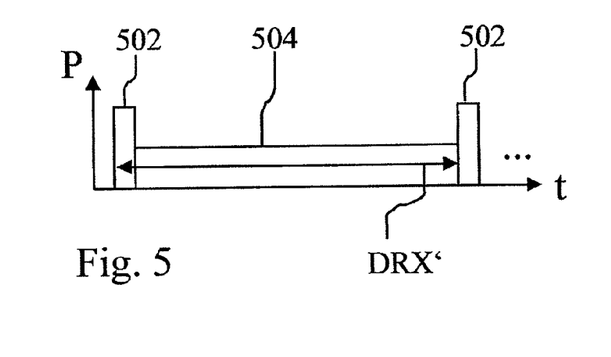

FIG. 2 shows, as a further embodiment of a method of operating a mobile radio communication terminal in the first application context mentioned above, a method of controlling a cycle duration which is dependent on the device parameter. In this control method, a check is performed during an interruption in an inactive state of the mobile radio communication terminal whether signals directed at the mobile radio communication terminal are being received from an external base station. FIG. 3 shows a variant of the method shown in FIG. 2. FIGS. 4 and 5 show in schematic form the power consumption of a mobile radio communication terminal in a predominantly inactive state as a function of time, across the cycle duration of several DRX cycles (FIG. 4) or an extended DRX cycle (FIG. 5).

In the GSM standard, an inactive state is referred to as "IDLE". The cycle duration for checking whether a paging signal directed at a mobile radio communication terminal is present or not is referred to as the DRX cycle duration. It is known that, in the GSM standard, different cycle durations may be used for this check in the IDLE state. In the UMTS standard, the situation is similar to that in the GSM standard. Here, too, it is possible for different DRX cycle durations to be specified. In both standards, however, only exactly one value for the DRX cycle may apply to all mobile radio communication terminals in a respective cell at a given time.

The assigned value of the DRX cycle duration depends on foreseeable scenarios that are likely to occur within a cell or within a larger area comprising a plurality of cells. According to chapter 4 of the technical specification in 3GPP TS 25.133, for example, the DRX cycle length is chosen according to whether a mobile radio communication terminal in a specific needs a quick cell change or a slow cell change. Such scenarios arise because of the size of the size of the cell and the typically fast or slow movement of mobile radio communication terminals in that cell.

In an urban environment, for example, consideration is also given to whether mobile radio communication terminals have to be able to change cell quickly, for example when a user moves from an cell above ground into a cell below ground when switching to the subway train. The aforementioned technical specification also takes upper limits for the DRX cycle duration into account, in order to permit optimal settings for the access wireless network and its operating power, and to prevent any loss of synchronization between the UE and the network. To guarantee the mobility of all subscribers, the "worst case" is often assumed. This means that the mobile radio communication terminal with the greatest speed moving through the smallest overlap between two base stations is taken as the criterion for selecting the DRX cycle duration. An overlap in this context is to be understood as that part of a mobile network cell in which the cell coverage overlaps the neighboring cell, that is to say, in which both the currently assigned ("serving") cell and also its neighboring cell can be received by the mobile radio communication terminal for measurement and comparison.

Such a cell-wide assignment of the DRX cycle duration harbors disadvantages for those mobile radio communication terminals in the cell that are permanently stationary on account of their function. This includes, for example, vending machines having a network link which is realized via mobile radio communication. According to the currently known prior art, such permanently stationary devices must check during their inactive state, with the same DRX cycle duration as a fast-moving mobile radio communication terminal, whether they are being paged or not. Not only is it checked whether there are any messages for the mobile communications device, but the frequency with which measurements of the neighboring cell are to be carried out to support mobility also depends on the DRX cycle. This leads to the disadvantage that a permanently stationary mobile radio communication terminal in the IDLE state must check unnecessarily often whether there are any signals being directed at the mobile radio communication terminal, and carry out measurements of the neighboring cell, and therefore has an unnecessarily high level of power consumption. This is explained below with reference to FIGS. 4 and 5.

In the diagram shown in FIG. 4, a double-headed arrow with the reference sign DRX indicates the cycle duration of a DRX cycle for a prior art mobile radio communication terminal. The situation shown in this Figure corresponds to an example of the power consumption of a mobile radio communication terminal according to the present invention which is assigned the device parameter "mobile". The power consumption cycle contains periodically recurrent activity phases 402, in which the check is carried out to determine whether a paging signal is being directed at the mobile radio communication terminal, and one or more measurements are carried out optionally (i.e. if required). Since the mobile radio communication terminal is basically in an inactive state ("IDLE"), the mobile radio communication terminal falls back to the inactive state after the interruption of the inactive state by the activity phase, i.e., into another inactivity phase 403, when no paging signal was detected during the activity phase.

Assuming—purely for sample calculation purposes—that the power consumption is 2 mW during inactivity phases 404 and that the power consumption is 4 mW during the activity phases 402, and that the inactivity phase has a duration of 0.5 s, whereas the activity phase has a duration of 0.1 s, then the resultant energy requirement is $3 \times 4 \text{ mW} \times 0.1 \text{ s} + 3 \times 2 \text{ mW} \times 0.5 \text{ s} = 4.2 \text{ mJ}$. The reduction in power consumption that is actually achieved is significantly greater than in this sample calculation.

By way of comparison, FIG. 5 shows a DRX cycle according to the operating method of the invention for a mobile radio communication terminal classified as "fixed". During the period which corresponds in the case of FIG. 4 to three DRX cycle durations, only one single DRX cycle is performed in the present embodiment according to FIG. 5. In this case, the energy requirement over the same period as in FIG. 4 is 4 mJ, if one assumes for sample calculation purposes that the activity phase 502 is likewise 0.1 s in duration and requires a power consumption of 4 mW, and that the power consumption during the inactivity phase is 2 mW.

In the example shown in FIG. 5, leaving out two activity phases 402 results in the extended DRX cycle duration DRX' compared with the scheme in FIG. 4. The extended DRX cycle duration for fixed mobile radio communication terminals may alternatively amount to a multiple of a DRX cycle duration specified for mobile communications devices that are indeed mobile. Alternatively, a fixed or variable value determined in some other way may be used for the extended DRX cycle duration.

The energy requirement of the mobile radio communication terminal over the period shown may thus be reduced by about 5% according to this calculation, which is used purely as an example. In this way, it is also possible to extend the operating time of a permanently stationary mobile radio communication terminal powered by a battery or an accumulator.

On the network side, mobile radio communication terminals having the device parameter "fixed" may be paged by paging signals that are repeatedly transmitted over a specific time period. This can prevent such a mobile radio communication terminal from missing a paging signal from the assigned base station that is transmitted during an inactivity period of the mobile radio communication terminal. In this variant, no further signaling would be necessary.

FIG. 2 now shows a flow diagram relating to the detection of the DRX cycle duration by a mobile radio communication terminal. This is thus an example of a method of operating a mobile radio communication terminal. In this method, the mobile radio communication terminal switches in a step 202 from an active to an inactive state. The method then branches, depending on whether the mobile radio communication terminal is a fixed or a mobile device. The branching point is represented in the flow diagram in FIG. 2 by a step 204. In the event that the device parameter value autonomously determined or detected by the mobile radio communication terminal indicates that it is a mobile, i.e., not a permanently stationary terminal, the method branches to step 206, in which the inactivity period 404 which can be used for this device class is used, and hence a DRX cycle duration according to the example in FIG. 4. If, in contrast, the device is a mobile radio communication terminal whose assigned device parameter indicates that it is a permanently stationary terminal, an inactivity period 504 according to the example in FIG. 5 is used in step 208, and hence a longer DRX cycle duration that is assigned to the device class "fixed".

In both cases, the definition of the duration of the inactivity phase, not shown in any further detail in FIG. 2, may include the mobile radio communication terminal previously detecting the applicable duration of the inactivity phase for the present value of the device parameter, or detecting the DRX cycle duration by exchanging signals with the assigned base station. The value is alternatively stored in, and retrievable from, the mobile radio communication terminal itself, for example on a subscriber identity module (SIM) or in some other non-volatile memory of the mobile radio communication terminal. Signaling with the base station makes sense in both alternatives, in order to permit suitably adapted signaling behavior on the part of the base station, in particular a paging signal that is repeated several times.

In one simple advantageous variant, double the DRX cycle is assumed as a fixed value for fixed terminal equipment, which means that a variant free of signaling can also be generated, since paging messages are repeated. It is also ensured that attention is given in every second paging period to information from the mobile radio communication terminal.

In an extended embodiment, assignment of the mobile radio communication terminals to even or odd paging occasions is used in addition to a specific reference. This is derived from the information available in the mobile radio communication network, or in its operating method, on the respective fixed mobile radio communication terminal.

It is not necessary for the applicable value of the device parameter to be retrieved or detected in the inactive state. Step 204 may be performed advantageously elsewhere in the operating method, at a place that is not described here in any further detail. For example, the value of the device parameter can be detected when the mobile radio communication terminal commences operation. The duration of the inactivity phase and hence the DRX cycle duration before transition to the inactive state in step 202 can then be set as well. In that case, all that needs to be retrieved in the inactive state is the preset applicable value of the DRX cycle duration.

In a step 210, depending on which device class is present, the device switches into the short activity phase 402 or 502 following after inactivity phase 404 or 504, in order to check whether a paging signal directed at the mobile radio communication terminal is present. If that is not the case, the device is switched back to the inactivity phase with the respectively application duration. This is represented in FIG. 2 by branching back to steps 206 or 208. If a paging signal is present, in contrast, the inactive state is left and in step 212 the steps known to a person skilled in the art are initiated for establishing a mobile communications link to the calling terminal. A transition from the inactive state to the active state is also carried out, of course, whenever a user of the mobile radio communication terminal establishes a communication link to another mobile radio communication terminal of its own accord. For the sake of simplicity, this is not shown in FIG. 2.

The operating method in FIG. 2 can be summarized in the form of the following table.

| Step | Brief description |
| --- | --- |
| 202 | Transition to an inactive state |
| 204 | Device class fixed/mobile? |
| 206 | Inactivity phase in the "mobile" case |
| 208 | Inactivity phase in the "fixed" case |
| 210 | Id there a paging signal? |
| 212 | Switch to the active state |

FIG. 3 shows a variant of the method in FIG. 2. In FIG. 3, reference signs with final two digits identical to those in FIG. 2 are used for those steps that are also carried out in the embodiment in FIG. 2. For example, step 302 involving the transition to the inactive state corresponds to step 202 in FIG. 2. Steps 304, 310, and 312 correspond to steps 201, 210, and 212 in FIG. 2, respectively. More detailed explanation of all the individual steps of the method is not necessary because reference can be made to FIG. 2. The following description concentrates on the differences between execution of the method as in the example shown in FIG. 3 compared to that shown in FIG. 2.

In the present embodiment, a step 303 which involves detecting an additional state parameter is additionally carried out. The state parameter may be, for example, the current charge status of an accumulator or a battery which supplies energy to the mobile radio communication terminal. If the charge status or charge level is low, it is useful that operation of the mobile radio communication terminal has as low an energy requirement as possible. In that case, the DRX cycle duration can therefore be modified in additional to the adjustment according to whether the device parameter is mobile or fixed. For example, the DRX cycle duration may be extended even further for fixed mobile radio communication terminals. For mobile radio communication terminals that are not permanently stationary, a higher value for the DRX cycle duration can be set in order to reduce the energy requirement, although said value is typically smaller than for a permanently stationary device. The current value of the state parameter detected in step 303 is taken into consideration in steps 306 and 308 when the duration of the respective inactivity phase is set.

Another item of information used to determine the state parameter can be the momentary state of some other device connected to the mobile radio communication terminal. A mobile communications module (as a mobile radio communication terminal), connected to a vehicle (as the other device), may be considered in the state "vehicle off" to be momentarily stationary. This is advantageous, in particular, in vehicles that are parked for a long period, in which the mobile radio system for operation in an anti-theft system cannot switch to the "off" state.

In one variant of the method in FIG. 3, taking the state parameter into consideration when setting the DRX cycle duration can be made additionally dependent on confirmation by the assigned base station. For example, the base station may prohibit any additional extension of the DRX cycle duration when the charge level of the battery is low, so as not to impair the network functionality.

Figure 6:
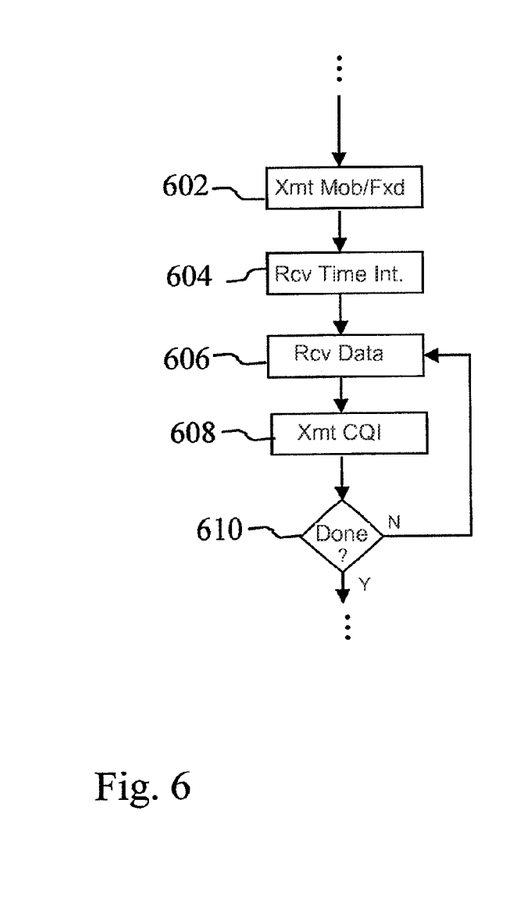
FIG. 6 shows a flow diagram of an embodiment of a method of operating a mobile radio communication terminal, wherein a channel quality indicator is transmitted by the mobile radio communication terminal to an assigned external base station.

FIG. 6 shows a flow diagram of an embodiment of a method of operating a mobile radio communication terminal in the aforementioned second application context, in which a channel quality indicator is transmitted by the mobile radio communication terminal to an assigned external base station.

The second application context relates to a methods for downlink data transmission, i.e. in the direction from a base station to a mobile radio communication terminal. In this case, the mobile radio communication terminal transmits a channel quality indicator to the base station at defined time intervals. The base station decides on the basis of this information and the number of mobile radio communication terminals currently connected to the base station which mobile radio communication terminal is assigned which channel for downlink data transmission.

The received channel quality indicators are also used in the base station to determine the output power of the base station. This procedure is applied, for example, in the known, standardized data transmission method called HSDPA (High Speed Downlink Packet Access) within UMTS, the mobile radio communication standard. The channel required in this transmission method for transmitting payload at higher data rates to the mobile radio communication terminal is called the HS-DSCH (High Speed Downlink Shared Channel). Data transmission is performed at predefined intervals referred to as TTI (transmission time interval). However, the data throughput does not increase proportionally to the number of channels being used, because interference among the channels increases the more channels are added. The channel quality deteriorates as a consequence.

The base station also takes account of the mobility of the mobile radio communication terminal when calculating the TTI time interval. It is known to transmit the channel quality indicator CQI on a control channel to the base station at predefined time intervals, or "CQI feedback cycles". The control channel is referred to as HS-DPCCH (High Speed Downlink Packet Control Channel). These time intervals correspond to cycle durations that are specified to the mobile radio communications device by the base station and, as described above, are dependent on the current mobility of a respective mobile radio communication terminal and the current intensity with which the mobile network cell is being used.

Like the previous embodiments, the method is part of a method of operating a mobile radio communication terminal. Preceding steps and subsequent steps of the method are not shown for the sake of simplicity.

The part of the method which is relevant here begins, in a step 602, with transmission from the mobile radio communication terminal to its currently assigned base station of the device parameter value indicating whether the mobile radio communication terminal is permanently stationary or not permanently stationary. In a step 604 which then follows, the mobile radio communication terminal receives from the respective base station a value for a time interval with which the mobile radio communication terminal is to transmit a respective current channel quality indicator to the base station when data are subsequently to be transmitted. As described above, the method is used, for example, in connection with HSDPA data transmission from the base station to the mobile radio communication terminal.

Steps 602 and 604 may be carried out at any time before data transmission begins. It is possible, but not imperative, to carry them out immediately before data transmission begins. Alternatively, these steps can also be carried out when the mobile radio communication terminal logs into the base station.

When data transmission begins, a loop formed by steps 606 to 610, described below, is started. Data are firstly received and, parallel thereto, a current value of the channel quality indicator CQI is detected. Execution of step 606 is known per se to a person skilled in the art. Compared to conventional methods, however, the present embodiment of a method of operating a mobile radio communication terminal differs in that the channel quality indicator is transmitted after the predefined time interval that varies here for permanently stationary mobile radio communication terminals from the value for not permanently stationary mobile radio communication terminals. The time interval for permanently stationary mobile radio communication terminals is longer than for not permanently stationary mobile radio communication terminals.

Together with the channel quality indicator CQI, a positive or negative acknowledgement signal ACK or NACK is sent in step 608 to the base station, thus indicating whether the data received in the meantime has been completely and correctly received. In the UMTS standard described in the foregoing, the channel quality indicator (CQI) is transmitted in a frame on the HS-DPCCH. This frame also contains the positive (ACK) or negative acknowledgement signal (NACK) signifying that data packets have been received at the mobile radio communication terminal correctly or with errors. By omitting transmission of a channel quality indicator, the frame in the UMTS standard is reduced in size by two thirds. If no data is currently being transmitted, this frame may even be left out entirely.

In a following step 610, a check is performed to determine whether any further data are ready to be received. If that is the case, the method branches back to step 606. If it is not the case, the operating method is continued with other steps that do not need to be described here in any further detail. Execution of the present embodiment can be summarized in the form of the following table:

| Step | Brief description |
|---|---|
| 602 | Transmission of the "mobile/fixed" device parameter |
| 604 | Receiving the time intervals for transmission of the CQI by the base station |
| 606 | Receiving data via HSDPA |
| 608 | Transmission of the CQI after the predefined time interval |
| 610 | Checking for presence of further data |

Figure 7:
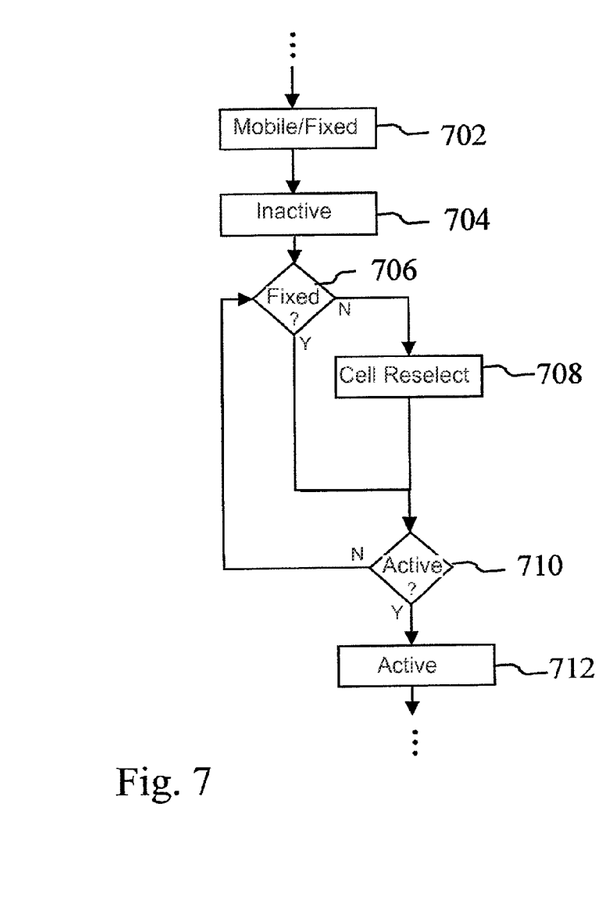
FIG. 7 shows a flow diagram of an embodiment of a method of operating a mobile radio communication terminal, wherein execution of a cell selection or cell reselection process by the mobile radio communication terminal is made dependent on whether the mobile radio communication terminal is permanently stationary or not permanently stationary.

FIG. 7 shows a flow diagram of an embodiment of a method of operating a mobile radio communication terminal in the third application context mentioned in the foregoing, wherein execution of a cell selection or cell reselection process by the mobile radio communication terminal is made dependent on whether the mobile radio communication terminal is permanently stationary or not permanently stationary.

In a step 702, the device parameter "mobile/fixed" is detected autonomously in the mobile radio communication terminal and sent to an assigned base station. Step 702 can be carried out at any time before step 704, described below. For example, the respective signaling with the base station may be carried out when the mobile radio communication terminal logs into the base station. At some later time, the mobile radio communication terminal switches from an active to an inactive state (in step 704). This state is the known IDLE state, for example. In the inactive state, execution of the method branches according to whether the device parameter value is "mobile" or "fixed". If the mobile radio communication terminal is a device which is not permanently stationary, a cell reselection process as known from the prior art is started in a step 708. However, if the mobile radio communication terminal is permanently stationary, step 708 is not performed. Cell reselection is thus omitted at this stage. In both alternatives, a check is performed in step 710 to determine whether there is any cause to switch back into the active state. If that is the case, the terminal is activated in step 712. If it is not the case, the method branches back to step 706. This means that a mobile radio communication terminal classified as not permanently stationary will subsequently restart the cell reselection process in accordance with the relevant stipulations, whereas a permanently stationary mobile radio communication terminal will again omit this step. In the case of a permanently stationary device, cell reselection is carried out only when the currently selected cell no longer fulfills the predefined criteria for a suitable cell, that is to say, no longer provides the possibility of starting a mobile radio link.

The method can be summarized in the form of a table as follows:

| Step | Brief description |
|---|---|
| 702 | Detecting the mobile/fixed device parameter, transmission to the base station |
| 704 | Transition to the inactive state |
| 706 | Branching, depending on whether device parameter is fixed or mobile |
| 708 | Only in the "mobile" case: cell reselection process |
| 710 | Checking whether cause to switch to active state |
| 712 | Transition to active state |

The invention claimed is:

1. A method of operating a mobile radio communication terminal, in which execution of at least one step of the method is controlled according to a device parameter which is assigned to the mobile radio communication terminal and which has exactly one of two possible device parameter values which indicate whether the mobile radio communication terminal is permanently stationary or not permanently stationary, wherein the at least one step comprises:

periodically interrupting an inactive state of the mobile radio communication terminal in order to check whether signals directed at the mobile radio communication terminal are being received from an external base station, wherein the check is carried out at intervals of a cycle duration which is assigned individually to the mobile radio communication terminal and which depends on the device parameter value which indicates whether the mobile radio communication terminal is permanently stationary or not permanently stationary, wherein the cycle duration depends additionally on at least one current value of a state parameter which indicates a current state of the mobile radio communication terminal, wherein the cycle duration is selected from a number of more than two cycle duration values according to a combination of the device parameter value and the current value of the state parameter, and the device parameter and the state parameter are subject to prioritization of such a kind that the one of the two parameters whose detected current value is assigned a longer cycle duration is weighted more heavily relative to other parameters when the cycle duration is being assigned.

2. The method according to claim 1, comprising:
autonomous determination or detection of the device parameter value by the mobile radio communication terminal.

3. The method according to claim 2, in which autonomous determination comprises:
    fetching the device parameter value from an internal memory of the mobile radio communication terminal.

4. The method according to claim 2, in which autonomous detection of the device parameter value comprises:
    conducting one or more measurements of a variable whose values indicate individually or collectively whether the mobile radio communication terminal is permanently stationary or not permanently stationary and determining the device parameter value according to the value of the variable.

5. The method according to claim 1, in which the cycle duration assigned to the mobile radio communication terminal has a first cycle duration value when the device parameter value assigned to the mobile radio communication terminal device indicates that the mobile radio communication terminal is permanently stationary, and the cycle duration otherwise has a second cycle duration value that is smaller in comparison to the first cycle duration value.

6. The method according to claim 1, in which measurements are carried out according to the cycle duration.

7. The method according to claim 1, in which the mobile radio communication terminal receives its assigned cycle duration from the external base station.

8. The method according to claim 1, in which the mobile radio communication terminal detects the cycle duration internally.

9. The method according to claim 1, comprising:
regularly repeated transmission of a respective current channel quality indicator from the mobile radio communication terminal to the external base station, wherein the channel quality indicator is a criterion for a signal-to-noise ratio or for a signal-to-noise-plus-interference ratio of a channel on which the mobile radio communication terminal receives radio signals directed at the mobile radio communication terminal from the external base station, and
wherein the transmissions are performed with a time interval which is individually assigned to the mobile radio communication terminal and which depends on the device parameter value which indicates whether the mobile radio communication terminal is permanently stationary or not permanently stationary.

10. The method according to claim 9, in which
the time interval between successive transmissions that is assigned to the mobile radio communication terminal is either received from the external base station assigned to the mobile radio communication terminal, or detected internally by the mobile radio communication terminal.

11. The method according to claim 1, comprising
detecting the device parameter value indicating whether the mobile radio communication terminal is permanently stationary or not permanently stationary;
changing from an active state to an inactive state;
periodically executing a cell selection or cell reselection process of the mobile radio communication device, wherein one of a plurality of receivable base stations is selected for communication with the mobile radio communication device after the mobile radio communication device has transitioned to an active state, but only if the device parameter value indicates that the mobile radio communication device is not permanently stationary, and if the mobile radio communication device is in the inactive state; and
not executing the cell selection or cell reselection process while the mobile radio communication terminal is in the inactive state, but only if the device parameter value indicates that the mobile radio communication terminal is permanently stationary, and if the mobile radio communication terminal is in the inactive state.

12. The method according to claim 1, in which the mobile radio communication terminal transmits the device parameter value to the external base station when or after the mobile radio communication terminal logs into the external base station.

13. A mobile radio communication terminal, comprising:
a terminal control unit which is configured to control execution of at least one operating step during operation of the mobile radio communication terminal according to a device parameter which is assigned to the mobile radio communication terminal and which has exactly one of two possible device parameter values which indicate whether the mobile radio communication terminal is permanently stationary or not permanently stationary, and further comprising a receiver unit, in which:
the terminal control unit is configured to switch the receiver unit periodically with a predetermined cycle duration from an inactive operating state of the mobile radio communication terminal to an active operating state;
the receiver unit is configured to check, when in the active operating state, whether signals directed at the mobile radio communication terminal are being received; and
the terminal control unit is configured;
    when in the inactive operating state, to activate the receiver unit with a cycle duration which is individually assigned to the mobile radio communication terminal and which depends on the device parameter value which indicates whether the mobile radio communication terminal is permanently stationary or not permanently stationary;
    to regularly and repeatedly transmit a respective current channel quality indicator detected using the receiver unit to an external base station, wherein the channel quality indicator is a criterion for a signal-to-noise ratio or for a signal-to-noise-plus-interference ratio of a channel on which the mobile radio communication terminal receives radio signals directed at the mobile radio communication terminal from the external base station; and to perform the transmissions with a time interval which is individually assigned to the mobile radio communication terminal and which depends on the device parameter value which indicates whether the mobile radio communication terminal is permanently stationary or not permanently stationary.

14. The mobile radio communication terminal according to claim 13, in which the terminal control unit is configured to determine or detect the device parameter value autonomously.

15. The mobile radio communication terminal according to claim 13, in which the terminal control unit is configured:
to detect the device parameter value indicating whether the mobile radio communication terminal is permanently stationary or not permanently stationary;
to switch the mobile radio communication terminal from an active state to an inactive state;
to periodically execute a cell selection or cell reselection process of the mobile radio communication device, but only if the device parameter value indicates that the mobile radio communication device is not permanently stationary, and if the mobile radio communication device is in the inactive state, wherein one of a plurality of receivable base stations is selected for communication with the mobile radio communication device after the mobile radio communication device has transitioned to an active state; and
to not execute the cell selection or cell reselection process while the mobile radio communication terminal is in the inactive state, but only if the device parameter value indicates that the mobile radio communication terminal is permanently stationary, and if the mobile radio communication terminal is in the inactive state.

16. The mobile radio communication terminal according to claim 13, in which the terminal control unit is configured to detect the cycle duration individually assigned to the mobile radio communication terminal, either internally or from control signals received from an external base station.

17. A method of operating a base station, comprising the steps of:
receiving from a mobile radio communication terminal a device parameter value which is assigned to the mobile radio communication terminal having a communication link to the base station, and which forms exactly one of two possible device parameter values which indicate whether the mobile radio communication terminal is permanently stationary or not permanently stationary; and
assigning to the mobile radio communication terminal at least one parameter value for performing at least one step of the method for operating the mobile radio communication terminal according to the received device parameter value, said step comprising:
assigning a cycle duration to the mobile radio communication terminal for periodic checking by the mobile radio communication terminal, during interruptions for that purpose in an inactive state of the mobile radio communication terminal, whether signals directed at the mobile radio communication terminal are being received,
wherein the cycle duration is assigned according to the device parameter value which is assigned to the mobile radio communication terminal and which indicates whether the mobile radio communication terminal is permanently stationary or not permanently stationary,
wherein regularly repeated reception of a respective current channel quality indicator transmitted from the mobile radio communication terminal, wherein the current channel quality indicator is a criterion for a signal-to-noise ratio or for a signal-to-noise-plus-interference ratio of a channel on which the mobile radio communication terminal receives radio signals directed at the mobile radio communication terminal from the base station; and
individual assignment of a time interval between transmissions to the mobile radio communication terminal, said time interval being dependent on the device parameter value which indicates whether the mobile radio communication terminal is permanently stationary or not permanently stationary.

18. A base station, comprising:
a receiver unit which is configured to receive from a mobile radio communication terminal a device parameter value which is assigned to the mobile radio communication terminal having a communication link to the base station, and which forms exactly one of two possible device parameter values which indicate whether the mobile radio communication terminal is permanently stationary or not permanently stationary;
a transmitter unit; and
a base station control unit which is connected to the transmitter unit and is configured to transmit at least one parameter value to the mobile radio communication terminal having a communication link to the base station, wherein
the parameter value influences execution of at least one step of a method for operating the mobile radio communication terminal, wherein
the at least one parameter value is dependent on the device parameter value which is assigned to the mobile radio communication terminal and which indicates whether the mobile radio communication terminal is permanently stationary or not permanently stationary, wherein
the base station control unit is configured to assign a cycle duration to the mobile radio communication terminal for periodic checking by the mobile radio communication terminal, during interruptions for that purpose in an inactive state of the mobile radio communication terminal, whether signals directed at the mobile radio communication terminal are being received, wherein
the cycle duration is assigned according to the device parameter value which is assigned to the mobile radio communication terminal and which indicates whether the mobile radio communication terminal is permanently stationary or not permanently stationary,
wherein the receiver unit is configured to receive regularly repeated respective current channel quality indicator values transmitted from the mobile radio communication terminal, wherein the current channel quality indicator values are a criterion for a signal-to-noise ratio or for a signal-to-noise-plus-interference ratio of a channel on which the mobile radio communication terminal receives radio signals directed at the mobile radio communication terminal from the base station; and
wherein the base station is configured to individually assign of a time interval between transmissions to the mobile radio communication terminal, said time interval being dependent on the device parameter value which indicates whether the mobile radio communication terminal is permanently stationary or not permanently stationary.

19. An operating method for a core network node of a mobile radio communication network, comprising:
receiving a device parameter value which is assigned to a mobile radio communication terminal assigned to the core network node, and which forms exactly one of two possible device parameter values which indicate whether the mobile radio communication terminal is permanently stationary or not permanently stationary; and
assigning at least one parameter value to a base station having a communication link to the mobile radio communication terminal, for transmission of at least one operating parameter to the mobile radio communication terminal having a communication link to the base station, for executing at least one step of the method for operating the mobile radio communication terminal according to the device parameter value which is assigned to the mobile radio communication terminal and which indicates whether the mobile radio communication terminal is permanently stationary or not permanently stationary, said assignment step comprising:
assigning a cycle duration to the mobile radio communication terminal for periodic checking by the mobile radio communication terminal, during interruptions for that purpose in an inactive state of the mobile radio communication terminal, whether signals directed at the mobile radio communication terminal are being received,
wherein the cycle duration is assigned according to the device parameter value which is assigned to the mobile radio communication terminal and which indicates whether the mobile radio communication terminal is permanently stationary or not permanently stationary,
wherein the cycle duration is selected from a number of more than two cycle duration values based on the device parameter value, and wherein the device parameter value is subject to prioritization of such a kind that one of two parameters whose detected current value is assigned a longer cycle duration is weighted more heavily relative to other parameters when the cycle duration is being assigned.

* * * * *